United States Patent [19]

Wennerstrom

[11] 4,049,644
[45] Sept. 20, 1977

[54] DEVICE FOR MEASURING TIP DEFLECTION OF ROTATING BLADES

[76] Inventor: Arthur J. Wennerstrom, 215 Mar-Ken Drive, Dayton, Ohio 45405

[21] Appl. No.: 699,902

[22] Filed: June 23, 1976

[51] Int. Cl.$^2$ .................... G01D 5/36; H01J 39/12
[52] U.S. Cl. .................... 250/233; 250/208; 356/167
[58] Field of Search .......... 324/166; 356/167, 138, 356/170, 172, 178; 178/DIG. 36; 250/231 SE, 233, 560, 561, 208; 73/71.3

[56] References Cited

U.S. PATENT DOCUMENTS

| | | | |
|---|---|---|---|
| 3,614,617 | 10/1971 | Blake, Jr. | 324/166 |
| 3,757,167 | 9/1973 | Yoshikawa et al. | 324/166 |
| 3,856,410 | 12/1974 | Swift et al. | 356/167 |
| 3,935,537 | 1/1976 | Batchlor | 324/166 |

Primary Examiner—Alfred E. Smith
Assistant Examiner—David K. Moore
Attorney, Agent, or Firm—Joseph E. Rusz; Robert Kern Duncan

[57] ABSTRACT

A reference mark for photo detection is placed on the disc or shaft of a blade carrying rotor of a turbomachine. A first light source and photodetector are aimed at the reference mark and provide an electrical pulse per revolution. A second light source and photodetector are positioned in the casing of the turbomachine adjacent to the rotor of interest. A first signal from the first photodetector turns on a first and second counter, counting pulses from a high frequency source. A signal from the second photodetector turns off the second counter. The next signal from the first photodetector turns off the first counter. The first counter provides a count of pulses per revolution. The second counter provides a count of pulses representative of arc of movement of the blade tip in interest from the time the reference mark passed the first photodetector until the next blade tip passed the second photodetector. The difference in the ratios of the count of pulses from the second counter with respect to the count from the first counter with the turbomachine unloaded and then loaded provides a figure, derived subsequently of rotational speed, that is representative of the circumferential deflection of the blade tip at the detection position due to the loading. The above sequence may be continued for multiple revolutions to provide an average result that is less influenced by blade vibration. By multiplying this figure times $2\pi R$, where R is the radius of the blade tip, the actual deflection of the blade tip in the units of measurement of R is obtained. Multiple photodetectors at different positions aimed at the blade tip will provide a profile of tip deflection. The loading referred to may be aerodynamic or centrifugal or both.

4 Claims, 1 Drawing Figure

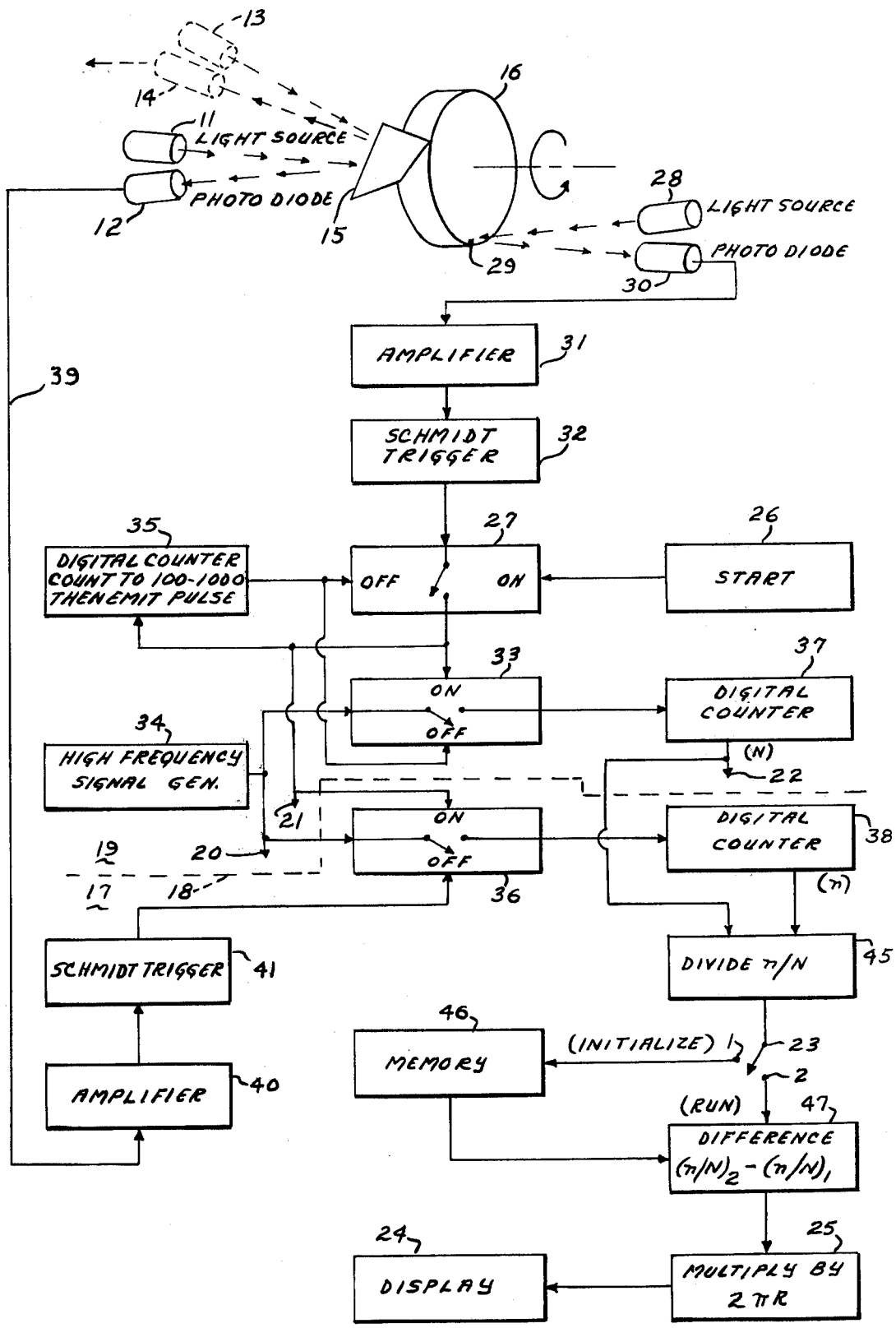

DEVICE FOR MEASURING TIP DEFLECTION OF ROTATING BLADES

RIGHTS OF THE GOVERNMENT

The invention described herein may be manufactured and used by or for the Government of the United States for all governmental purposes without the payment of any royalty.

BACKGROUND OF THE INVENTION

The field of the invention is in the measurement art, and more particularly the art of measurement of tip deflection of rotating blades in turbomachinery.

It is customary to modify the manufacturing design coordinates of turbomachine blading an estimated amount such that under full centrifugal and gas bending loads, the blade will deflect to the desired shape and setting angle of the design calculations. Prior to this invention a precise means of measuring the deflections along the edge of the blade tip of a rotor blade relative to its root during operation of a turbomachine has not been available.

The following patents may be of interest in furnishing background information relative to the state of the art, U.S. Pat. No. 3,502,967 to patentees J. E. Bridges et al., U.S. Pat. No. 3,614,617 to patentee B. S. Blake, Jr., and U.S. Pat. No. 3,856,410 to patentees G. Swift et al.

SUMMARY OF THE INVENTION

The invention provides a system that uses the outputs of electrooptical sensors to directly control counters, producing a real time digital signal which is directly related to blade deflection.

BRIEF DESCRIPTION OF THE DRAWING

The FIGURE of the drawing schematically illustrates an embodiment of the invention.

DESCRIPTION OF THE PREFERRED EMBODIMENT

Generally, to adequately examine the deflection of a blade tip an array of optical sensors, typically between two and six in number, is placed in the outer casing of a turbomachine, adjacent to the rotor for which blade tip deflection is to be measured, axially distributed between the leading and trailing edge planes, and circumferentially arranged to approximately follow the camber line of an adjacent blade. In the drawing, for simplicity, only one blade sensor system is schematically detailed, one having conventional light source 11 and conventional photodiode detector 12. It is to be understood that, while not necessary to provide a working system, generally additional light sources 13 and detectors 14 will be used to give a profile of the deflection along the complete edge of blade tip 15 of rotor 16 of the turbomachine. While only the blade 15 is illustrated, the rotor obviously has many blades distributed along its periphery. More than one blade may be examined by placing additional light sources and sensors in the rotor casing aimed at other blade tips. A conventional light source and photodetector assembly is required for each location of deflection interest, with its associated electronic system and display-indicator 17 as diagrammed below dotted line 18 of the drawing. Electronic system 19 is common with all the indicating systems. The connections to additional deflection measurement systems is made at points 20, 21, and 22 and they are essentially duplicates of subsystem 17. With embodiments of the invention having a plurality of measurement locations the necessary plurality of switches 23 may be conventionally ganged so as to be operated simultaneously, and display unit 24 may be a plurality of units, one for each measurement location, or a single digital display unit may be switched from one system to the other systems. Obviously, the radius constant set into the system as a factor in multiplier 25 must be the value for the particular blade tip radius monitored by that particular photodetector.

In the FIGURE and in the following discussion, the system is described as having the light source and photodetector directly aimed at a position passed by the blades of a rotor of the turbomachine, it is to be understood that for installation convenience as well as temperature and vibration isolation of the light source and photodiodes, fiber optic bundles of several feet in length may be used to transmit light from one or multiple light sources to the blade tip locations of interest and the light directed thereon. Fiber optics may also be used to return the light reflected and scattered by a passing blade to respective photodiodes.

The invention comprises a new combination of well known elements illustrated in the schematic-block diagram to provide a novel and useful result. The operation of the apparatus may best be described by illustrating the taking of a measurement of the deflection of a blade at a location on a blade tip. The turbomachine is first operated at low rotational speed where the deflection of the blades is negligibly small. The measuring system is energized by manually actuating start circuit 26 and manually placing switch 23 to position 1. Start control 26 in addition to placing switch 27 in the on position energizes the electronic circuits, light sources 11, 28 and any other sources 13, and starts high frequency generator 34. When highly reflective mark 29 on rotor 16 at the blade root position passes through the light from source 28, a reflection is received by photodiode photodetector 30 and an electronic pulse is generated thereby which is amplified by amplifier 31 to actuate trigger circuit 32 which provides a conventional control pulse that flows through previously turned on switch 27 and functions as a control to turn on conventional solid state electronic switches 33 and 36, and start a count sequence in digital counter 35. Conventional counter 35 has previously been set to provide an output control pulse after an arbitrarily determined number of counts, determined primarily by the vibration present in the equipment. A 500 count is a typical figure that is generally suitable. With switch 33 "on", counts of pulses from the uniform train of high frequency pulses generated by signal generator 34 are counted in the digital counter 37. Also with switch 36 "on" the pulses from generator 34 are counted by digital counter 38. Both counters that started at the same time are now counting. Rotor 16 doesn't have to move very far until photodetector 12 provides a pulse on line 39 due to a blade passing into the illumination from light source 11 and reflecting light back to the photodiode 12. This output from the photodiode on line 39 is amplified by amplifier 40 to provide a control signal for conventional trigger circuit 41 which provides a control pulse to turn off switch 36. Digital counter 38 now stops counting and provides an output representative of "$n$" counts. Counter 37 continues to count. After one revolution of rotor 16, digital counter 37 has stored (counted) N counts. The ratio of $n/N$ is a number representative of the blade tip position with respect to the indicator mark and the sensor position. Since, in general, the blades will always have some degree of vibration and the amplitude of the vibration may be a significant fraction of the total tip deflection, it is usually desirable to obtain an average of the above measurements over several revolutions in order to obtain a representative mean value for the safety state deflection associated with a particular operating speed and load. This can be simply accomplished by summing both n and N over several revolutions (e.g., 100 to 1000) as is illustrated. Thus, after this first revolution, marker 29 activates photodiode 30 by reflecting light from source 28 and another pulse from trigger circuit 32 traverses switch 27 (which is still on) and places another count in counter 35. This pulse also appears at switch 33 but it is still on and no change occurs. It does, however, turn switch 36 back on and counter 38 continues adding to the count of previous pulses until switch 36 is turned off by blade 15 again reflecting light to photodiode 12. This process continues until the present number of counts occur in counter 35 (typically 500), at which time counter 35 opens (turns off) switches 27 and 33. Counter 37 now provides an output N which is the number of counts per revolution times the total number of revolutions as determined by the setting placed in counter 35. Counter 38 now provides an output of n counts which is the summation of the number of counts occurring between the time marker 29 passes the photodiode 30 and blade 15 passes light to diode 12 for each revolution summed over this same number of revolutions (i.e., typically 500).

The ratio of n/N for each casing mounted sensor location is independent of rotational speed as long as the blade deflection is zero. The ratio of n/N obtained at this low rotational speed where blade deflection is negligible is defined as $(n/N)_1$, and it is obtained by conventional digital divider 45 and since manually operated switch 23 is in position 1 the value thus obtained is stored in memory unit 46 as an initial value. The turbomachine is now speeded up to the speed and conditions of which it is desired to measure the blade deflection. Switch 23 is put in position 2 and start control 26 is manually activated. The foregoing described operation is repeated with the turbomachine operating at a desired high speed running condition and a new ratio of nN designated $(n/N)_2$ is now obtained by divider 45, (after the number of revolutions as set by counter 35 have passed).

The circumferential deflection $S_c$ of blade 15 at the point of observation of the photodiode 12 between the first condition at slow speed and the second condition at running speed is defined by:

$$S_c = 2\pi R[(n/N)_2 - (n/N)_1]$$

where R is the local radius of the blade tip at the point of observation. The value of $(n/N)_1$ previously obtained and stored in memory 46 is subtracted from the currently obtained value of $(n/N)_2$ by difference operator 47 and the thus obtained value is multiplied by $2\pi R$ by multiplier 25 and the result displayed digitally by readout display 24.

It is to be observed that the complete system is entirely digital and may readily be implemented by conventional binary digital microprocessors and displayed by conventional readout display such as the seven segment numerical readout display giving the amount of blade tip deflection in thousandths of an inch (or metrically, of course, if desired).

The numbers involved concerning response time and frequency of the signal generator depend upon the measurement accuracy desired and the tip speed of the moving blade. Those skilled in the art will readily determine the design requirements for a particular application. Typically, a desired accuracy in the measurement of tip deflection is ± 0.001 inch, or better, at tip speeds up to approximately 1800 ft/sec. Under these conditions a blade will move 0.0005 inches in $23 \times 10^{-9}$ seconds relative to the adjacent casing. Therefore, for this accuracy of response, all elements of the system concerned with switching and counting should be able to respond in a time interval approximately equal to or less than 23 nanoseconds. Also, allowing an error of plus or minus one cycle in frequency counting, the minimum signal generator frequency consistent with this is the reciprocal of 23 nanoseconds or 43.5 megacycles. Thus, current state of the art conventional solid state electronic sensing, switching, and counting components are suitable for the individual components of a typical embodiment of the invention.

The absolute and relative placement of the indexing reflective marker on the rotor body, and the placing of the light sources and photodetectors are generally not critical. Rare, would be the instance where the n counter would be stopped after only a count or two each revolution, but since it is theoretically possible, it is generally desirable to locate the blade tip sensors on the periphery of the casing in a general location that is slightly after the last previous blade has passed but before the one on which measurements are to be made, as the indexing marker is passing the one per revolution signal sensor. This will provide a relatively large numerical number of counts for n and make less critical the possibility of lost counts due to vibration or other causes. The value and accuracy of the readout indications are not otherwise affected by the physical locations of measuring components, and thus generally they are not critical. It is only the change in the position with respect to the rotor, that occurs to the point at which light is reflected by the blade and the resultant relative time interval change in light reflection per revolution, between the initialized condition and the run condition that is measured and displayed.

I claim:

1. Apparatus for measuring the change of circumferential position of a location on the tip of a blade having a radius of rotation of a rotor of a turbomachine between a first condition of operation of the turbomachine and a second condition of operation of the turbomachine comprising:
   a. means for detecting revolutions of the said rotor;
   b. means for detecting the passage of a blade past a given location;
   c. a high frequency signal generator generating a signal of a uniform train of pulses;
   d. means cooperating with the said means for detecting revolutions and the said signal generator for providing an output "N" representative of the numerical number of pulses per revolution;
   e. means cooperating with the said means for detecting revolutions and the means for detecting the passage of a blade and the said signal generator for providing an output "n" of a numerical number of pulses representative of the position of the said location on the blade;

f. means for dividing the said output $n$ by the said output N and providing an output representative of the ratio of $n/N$;

g. means for providing an output representative of the difference in the value of the ratio of $n/N$ between the said first condition of operation and the said second condition of operation of the turbomachine;

h. means for providing a product output of the multiplication of the said difference output and $2\pi$ times the numerical value of the said radius of the said blade tip; and i. means for digitally displaying the said product output.

2. The apparatus as claimed in claim 1 wherein all the said means are digital means and all the said outputs are digital outputs.

3. The apparatus as claimed in claim 2 wherein the said digital means for detecting revolutions of the rotor includes a light source, a photodetector and a reflective mark on the said rotor.

4. The apparatus as claimed in claim 3 wherein the said digital means for detecting the passage of a blade past a given location includes a light source and a photodetector.

* * * * *